July 8, 1952 K. B. BRITTON 2,602,627
VALVE ASSEMBLY
Filed June 13, 1945 2 SHEETS—SHEET 2
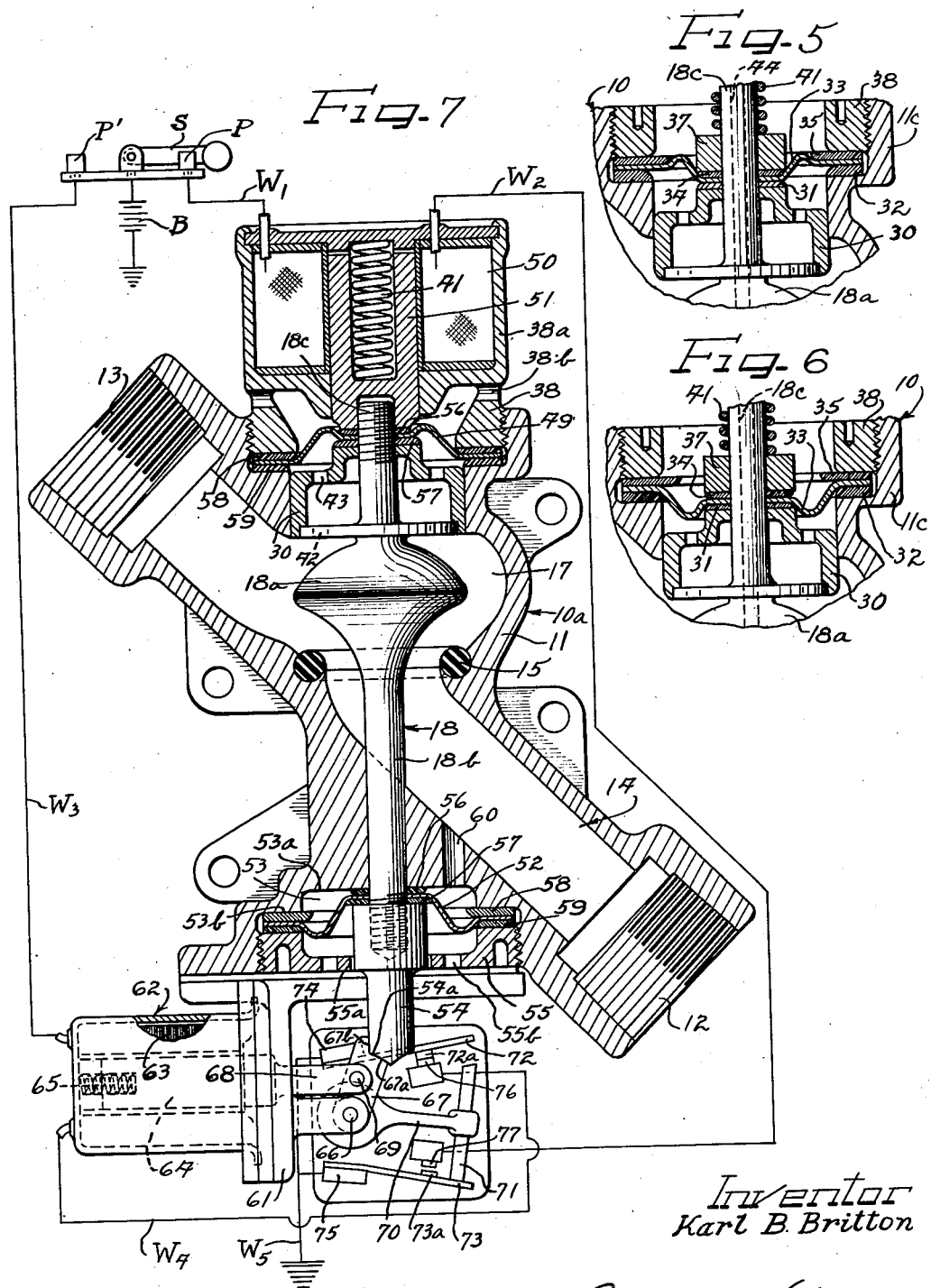
Inventor
Karl B. Britton Patented July 8, 1952

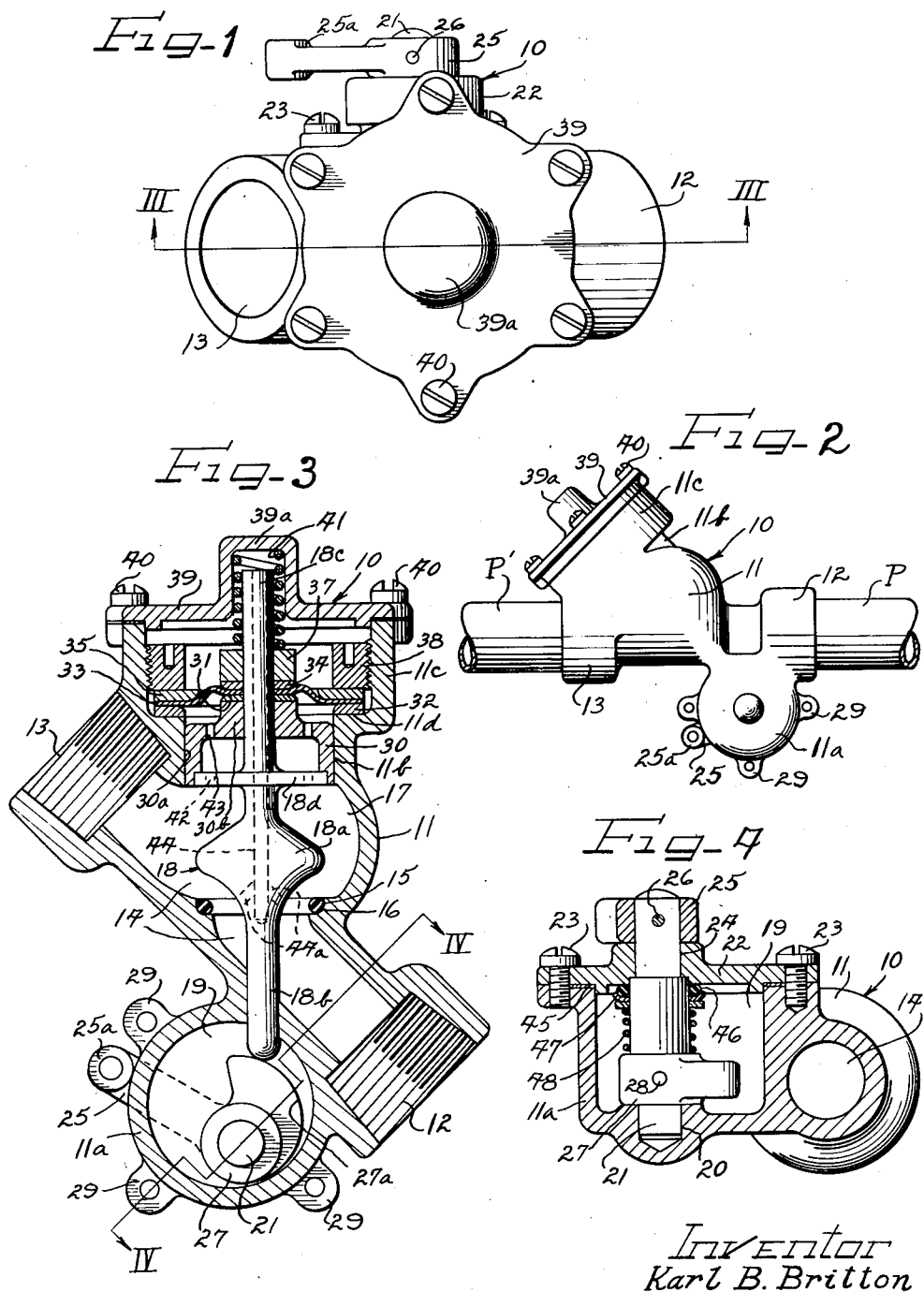

2,602,627

UNITED STATES PATENT OFFICE 2,602,627

VALVE ASSEMBLY

Karl B. Britton, Bratenahl, Ohio, assignor to Thompson Products, Inc., Cleveland, Ohio, a corporation of Ohio Application June 13, 1945, Serial No. 599,195

4 Claims. (Cl. 251—20)

This invention relates to fluid flow control valves wherein the effect of fluid pressures on the movable valve members thereof is balanced to decrease the forces required to move the valve.

More specifically, this invention deals with valves having balancing diaphragms so arranged as to maintain valve-operating torque requirements at a minimum.

In accordance with this invention a fluid flow control member or valve is mounted in a casing for movement toward and away from a seat in the casing and one or more balancing diaphragms are so arranged that fluid pressure acting thereon either partially or completely balances out the effect of the fluid pressure on the control member or valve. In a preferred form of the invention the diaphragm or diaphragms are arranged to slightly unbalance the control member or valve so that the pressure holding the valve closed increases slightly as the fluid pressure increases, thereby utilizing increased fluid pressure for sealing the more difficultly sealed high pressure fluid. In another form of the invention the fluid pressure effect on the flow control member or valve is completely balanced out.

This invention also provides spring-pressed control members or valves wherein the force required to open the valve against any one selected fluid pressure is the same at the beginning and end of the travel of the control member or valve even though the spring pressure or load on the control member or valve increases as the spring is compressed.

A feature of this invention is to reduce the pressure drop through fluid flow control valves by minimizing the change of direction of fluid through the valve.

Another feature of this invention is to provide a fluid flow control valve having a low pressure drop effect on fluid flowing therethrough together with coaxial inlet and outlet ports permitting installation of the valve in a pipe line without creating an offset in the pipe line.

A still further feature of this invention is the provision of an off-centered cam for manually operating the valve. This cam is arranged so that a spring-pressed valve is automatically locked in open position since the spring then tends to rotate the cam in a direction such that a stop acting on the cam prevents further rotation.

Another feature of the invention is the provision of an electrically operated valve wherein electric current is only used to change the position of the valve. According to this arrangement electric actuators for the valve are automatically deenergized when the valve assumes the position for which the actuators were energized.

A further feature of this invention is to provide a diaphragm-equipped valve wherein a passage through the valve member vents one face of the diaphragm to fluid pressure on one side of the valve seat.

It is, then, an object of this invention to provide fluid flow control devices or valves wherein the effect of fluid pressure on the valve is so balanced as to decrease the forces required to operate the valve and thereby maintain operating torque at a minimum.

Another object of the invention is to provide fluid flow control valves wherein the fluid pressure in the valve has a partial but controlled unbalancing effect on the valve for better sealing the valve as fluid pressure increases.

A still further object of the invention is to provide spring-pressed fluid flow control valves wherein the force required to open the valve against any one selected fluid pressure is the same at the beginning and end of the travel of the valve even though the spring load on the valve changes.

Another object of the invention is to provide balanced fluid flow control valves accommodating fluid flow therethrough in opposite directions without interfering with the balancing of the valve.

Another object of the invention is to provide a valve having coaxial inlet and outlet ports and only a minimum pressure drop effect on fluid flowing therethrough.

A still further object of the invention is to provide an electrically operated valve wherein electric energy is utilized only in changing positions of the valve.

A still further object of the invention is to provide a solenoid-driven valve which is automatically locked in open position and held in closed position by spring pressure, and wherein the solenoids are energized only when changing the positions of the valve.

A still further object of the invention is to provide a cam for a spring-actuated valve which automatically locks the valve in open position and utilizes the spring load on the valve for locking.

Other and further objects of this invention will be apparent to those skilled in the art from the following detailed description of the annexed sheets of drawings which, by way of preferred examples only, illustrate two embodiments of the invention.

On the drawings:

Figure 1 is a plan view of a manually operated valve according to this invention.

Figure 2 is a side elevational view of the valve of Figure 1 illustrating the installation of the valve in a straight line arrangement of pipes.

Figure 3 is a horizontal cross-sectional view taken along the line III—III of Figure 1.

Figure 4 is a cross-sectional view, with parts in elevation, taken along the broken line IV—IV of Figure 3.

Figure 5 is an enlarged fragmentary vertical cross-sectional view of a portion of the valve illustrated in Figure 3, showing one position of the diaphragm.

Figure 6 is a view similar to Figure 5 illustrating another position of the diaphragm.

Figure 7 is an axial cross-sectional view, with parts in elevation, illustrating a double diaphragm valve according to this invention equipped with actuating solenoids and showing a wiring diagram for the solenoids.

As shown on the drawings:

The valve 10 of Figures 1 to 6, as best shown in Figure 3, is composed of a casing 11 having coaxial ports 12 and 13 on opposite sides thereof joined by a substantially straight fluid flow path 14. A valve seat 15 is provided in the fluid flow path 14 about midway between the ports 12 and 13. This valve seat is arranged at about a 45° angle relative to the flow path 14. The valve seat 15 is illustrated as being formed of a rubber O ring, but it should be understood that any suitable seat can be used, including a metal seat or a composition seat. The O ring forming the seat 15 is affixed to the casing wall in a groove 16.

An enlarged chamber 17 is provided by the casing 11 in the fluid flow path 14 on the upper side of the valve seat 15. This chamber receives the closure head 18a of a slidably mounted valve 18. The valve 18 has a bottom stem 18b projecting through the seat 15 and through the casing wall into a cam chamber 19 defined by a portion 11a of the casing 11 adjacent the inlet port 12. This casing portion 11a, as best shown in Figure 4, has a well 20 in one end face thereof forming a bearing for one end of a cam shaft 21. The casing portion 11a is closed by a cover 22, secured by means of cap screws 23, which are threaded into ears or lugs 29 on the casing portion 11a. The cover has a boss portion providing a bearing 24 for the other end of the cam shaft 21. The cam shaft 21 projects through the cover and an operating lever 25 is secured to the projecting portion as by means of a pin 26.

A cam 27 is provided in the chamber 19 and is pinned to the shaft by means of a pin 28 for co-movement with the shaft. The cam 27 has an arcuate cam portion 27a with a center spaced from the axis of the shaft so that, when the cam is rotated to a position for unseating the valve head 18a, as shown in Figure 3, the valve will tend to further rotate the cam in the same, or clockwise direction. However, the operating lever 25 has a stop 25a on the end thereof which will engage the casing 11a to prevent further clockwise rotation of the cam. The valve is thus locked in open position and can only be closed when the lever 25 is moved in a counter-clockwise direction to swing the cam portion 27a out from under the end of the valve stem 18b.

The valve 18 has an upper stem 18c projecting from the head 18a. A collar 18d is formed on this stem 18c. The collar is fitted into a piston 30 which is slidably mounted in a cylindrical portion 11b of the casing 11. This piston has the skirt portion 30a thereof slidably engaging the cylindrical wall 11b of the casing and has a head 30b snugly surrounding the stem 18c. The head 30b can be press-fitted or threaded onto the stem 18c and a washer 31 overlies the head 30b of the piston.

The casing 11 has an enlarged cylindrical portion 11c above the cylindrical portion 11b. A shoulder 11d is formed in the casing at the top of the cylindrical portion 11b and a washer 32 is seated on this shoulder 11d.

A flexible diaphragm 33 composed of limp sheet-like material, such as sheet rubber, non-porous impregnated fabric, leather, plastic or the like, overlies the washers 31 and 32.

A washer 34 snugly engaging the stem 18c of the valve overlies the central portion of the diaphragm 33 above the washer 31. A washer 35 overlies the peripheral portion of the diaphragm 33 above the washer 32. The washer 35 has a smaller inside diameter than the washer 32 but the washers 31 and 34 have substantially the same outer diameter.

Because of this arrangement, the diaphragm 33 has a smaller effective area or "equivalent piston" when it is in bowed up position against the washer 35, as shown in Figures 3 and 5, than it has when it is bowed down away from the washer 35 as shown in Figure 6 for a purpose to be hereinafter more fully described.

A nut 37 is secured, by threads, press-fit or the like, onto the stem 18c above the washer 34 to clamp the central portion of the diaphragms between the washers 31 and 34.

A ring 38 is threaded into the portion 11c of the casing to act on the washer 35 for clamping the outer peripheral portion of the diaphragm 33 between the washers 32 and 35.

A cover 39 is provided for the casing portion 11c and is secured thereto by means of cap screws 40 or the like. This cover 39 has a central boss portion 39a providing a well for receiving a coil spring 41. The coil spring has one end coil bottomed in the well and has the opposite end coil bottomed on the nut 37.

The bottom face of the diaphragm 33 is exposed to the pressure existing in the chamber 17 of the valve since the collar 18d and the head 30b of the piston have vent holes 42 and 43 respectively.

A passageway 44 is formed through the valve stem 18c and extends down through the head 18a of the valve. Branch passages 44a connect this passageway 44 with the lower part of the valve casing even when the valve is in closed position. The passages 44a and 44 thus connect the bottom side of the flow path 14 with the well defined by the boss 39a of the cover 39 and this well is in full communication with the upper face of the diaphragm 33.

Thus the bottom face of the diaphragm 33 is always vented to pressure existing in the casing 11 on the upper side of the valve seat 15 while the top face of the diaphragm is always subjected to pressure existing in the casing 11 on the lower side of the valve seat 15.

As shown in Figure 2, pipes P and P', when connected to the ports 12 and 13 of the valve 10 of this invention are in coaxial alignment. The valve 18 in the casing 11 and the valve seat 15 then lie at an angle of about 45° relative to these pipes. Since the flow path 14 is coaxial with the pipes P and P', and since the fluid must only make slight angular changes of direction in flowing through the seat and around the valve head instead of the conventional right angular changes of direction in a globe or poppet valve, the fluid flow through the valve is substantially unimpeded and only a very low pressure drop will be encountered. Turbulence of the fluid is likewise maintained at a minimum.

As shown in Figure 4, the chamber 19 is sealed against leakage by a gasket 45 interposed between the casing portion 11a and the cover 22, while leakage through the boss portion of the cover along cam shaft 21 is prevented by a rubber O ring 46 in a retainer 47 that is spring pressed by a spring 48 against the cover in snug relation with the cam shaft 21.

As illustrated in Figure 5 whenever the pressure on the lower face of the diaphragm 33 is greater than the pressure on the upper face, the diaphragm assumes an upwardly bowed position against the washer 35 and the equivalent piston or effective area of the diaphragm is decreased by the amount that the washer 35 projects beyond the washer 32.

On the other hand, when the pressure on the upper face of the diaphragm 33 is greater than the pressure on the lower face, as shown in Figure 6, the diaphragm will bow downwardly away from the washer 35 and the effective area or equivalent piston of the diaphragm is increased by the uncovered area of the washer 35.

If the port 12 is an inlet port, and thus on the pressure side of the valve, the fluid pressure in this side of the valve tends to unseat the valve head 18a with a force equal to the pressure drop on opposite sides of the valve seat 15 multiplied by the area of the valve head exposed to pressure. However, this same pressure also acts on the diaphragm 33 but in an opposite direction, tending to seat the valve head 18a on the seat 15.

On the other hand, if the port 13 is an inlet port, and thus on the pressure side of the valve, the fluid pressure in this side tends to seat the valve head 18a against the seat 15 with a force equal to the pressure drop on opposite sides of the seat multiplied by the area of the valve head exposed to pressure. However, the same pressure acts on the diaphragm 33 but in an opposite direction, tending to unseat the valve head 18a.

If the effective area or equivalent piston of the diaphragm 33 is equal to the effective area of the valve head 18a exposed to fluid pressure when the valve is seated, the effect of fluid pressure on the valve can be completely balanced out, since the same force acts on the valve in opposite directions. Complete balancing out of the fluid pressure effect on the valve is accomplished by so proportioning the washers that the area of the equivalent piston of the diaphragm becomes the same as the area of the valve head exposed to the fluid pressure. In this case, the inner washers 31 and 34 can have the same outer diameter while the outer washers 33 and 35 have the same inner diameter. With such a change, the effective area of the diaphragm 33 is the same irrespective of whether it is in upwardly bowed or downwardly bowed position and, as explained above, if this effective area is the same as the effective area of the valve head then fluid pressure on the valve will have no effect in tending to move the valve head. The valve is then held closed solely by the load of the spring 41.

Since, as illustrated, the washer 35 has a smaller inside diameter than the washer 33, a slight desired unbalance for the valve is obtained so that the pressure holding the valve in closed position increases slightly as the fluid pressure increases. In such constructions, the total pressure holding the valve closed comes in part from the spring 41, and in part from the fluid pressure. This arrangement is desirable since increased fluid pressures will not cause the valve to leak and yet valve operating torque will be maintained at a minimum.

Thus, if the port 12 is an inlet port, the pressure drop across the valve seat 15 produces a force bowing the diaphragm 33 downwardly as shown in Figure 6, thereby creating an effective area or equivalent piston that is slightly larger than the effective area of the valve head and fluid pressure will aid the spring in holding the valve closed. On the other hand, if the port 13 becomes an inlet port, the pressure drop across the seat 15 creates a force tending to urge the valve head against its seat, but this same force bows the diaphragm upwardly as shown in Figure 5 and decreases the effective area or equivalent piston of the diaphragm 33 thereby cancelling out some of the effect of this force tending to unseat the valve. The valve will thus remain closed with a force exerted by the spring 41 plus a controlled force from the fluid pressure obtained by having the effective area of the valve head exposed to fluid pressure greater than the effective area of the upwardly bowed diaphragm. In both instances, of course, when the valve is opened, no appreciable pressure drop exists between the inlet and outlet sides of the valve, and both faces of the diaphragm are exposed to the same pressure to eliminate any valve-shifting capacity of the diaphragm.

If desired, the arrangement can be such that, for any one selected fluid pressure drop across the valve seat, the force required to open the valve will be the same at the beginning and at the end of the travel of the valve even though the spring load on the valve increases as the spring is compressed. For example, if the valve head is subjected to a pressure of 30 lbs. per square inch tending to unseat the valve, and if the expanded spring 41 exerts a load of 3 lbs. on the valve when it is closed but exerts a load of 6 lbs. on the valve when it is compressed and the valve is opened, the effective area or equivalent piston of the diaphragm can be regulated so that fluid pressure will exert a closing force of 3 lbs. on the valve when it is seated and thereby adding to the 3 lbs. spring load to make a total force of 6 lbs. holding the valve closed.

In Figure 7 there is illustrated a multi-diaphragm-equipped and solenoid-operated valve 10a. In this figure, parts identical with, or substantially identical with, parts described in connection with Figures 1 to 6, have been marked with the same reference numerals.

It should be understood that the valve of Figures 1 to 6 can be solenoid-operated, like the valve of Figure 7, and that the valve of Figure 7 can be manually operated, like the valve of Figures 1 to 6.

In the valve 10a the ring 36 for the diaphragm 49 carries a casing 38a for a solenoid coil 50. This coil 50 surrounds a core 51 which receives the coil spring 41 therein and is threaded onto the stem 18c of the valve 18. The spring 41 thus acts through the core 51 to urge the valve head 18a against the valve seat 15.

The lower face of the diaphragm 49 is vented to the chamber 17 in the valve casing 11 as in the valve 10, but the top face of the diaphragm 49 is vented not to the flow path 14 but to the atmosphere through the ports 38b. The valve member 18 of the valve construction 10a does not have a passageway through the stem 18c.

In the valve assembly 10a a lower diaphragm 52 is provided in addition to the top diaphragm 49. This lower diaphragm 52 has the central portion thereof fixed for co-movement with the valve stem 18b and has the peripheral portion thereof sealingly clamped to the valve casing. The stem 18b of the valve 18 is slidable through the lower part of the casing into a chamber portion 53 provided by the casing. An extension member 54 is threaded onto the lower end of the stem 18b. A cap 55 is threaded into the casing to cover the bottom of the chamber 53 and to clamp the diaphragm 52 in place. This cap 55 has a central aperture 55a freely receiving the member 54 and vent holes 55b for venting the chamber 53.

A washer 56 fixed to the valve stem 18b underlies the top end face 53a of the chamber 53 and overlies the central portion of the diaphragm 52. A second washer 57 of slightly greater diameter than the washer 56 underlies the central portion of the diaphragm 52. The extension member 54 abuts the washer 57 and clamps the central portion of the diaphragm 52 between the washers 56 and 57 for co-movement with the valve 18.

The casing has a shoulder 53b around the chamber 53 which receives a washer 58 thereagainst. This washer 58 has an inside diameter sized to cooperate with the washer 56 for controlling the effective area or equivalent piston of the diaphragm 52 in upwardly bowed position. A washer 59 underlies the outer peripheral portion of the diaphragm 52 and is acted on by the cap 55 to cooperate with the washer 58 for sealingly clamping the outer peripheral portion of the diaphragm 52 relative to the casing. The washer 59 has an inside diameter sized to cooperate with the washer 57 for determining the effective area or equivalent piston of the diaphragm 52 when the diaphragm is in downwardly bowed position.

The diaphragm 52 separates the chamber 53 into upper and lower compartments. The upper compartment is vented to the flow path 14 by means of a port 60 in the casing wall. The lower portion of the chamber 53 is vented to the atmosphere through the vent holes 55b. Thus the upper face of the diaphragm is exposed to pressure in the valve casing on the port side 12 while the lower face of the diaphragm is exposed to atmospheric pressure.

The top diaphragm 49 has central washers 56 and 57 identical with the washers 56 and 57 for the lower diaphragm 52 and also has peripheral washers 58 and 59 identical with the washers 58 and 59 for the lower diaphragm. The bottom face of the top diaphragm 49 is thus vented to the interior of the valve casing on the port side 13 thereof while the top face of the diaphragm is vented to the atmosphere through the vent holes 38b.

In the arrangement of Figure 7, the valve is balanced for flow of fluid in either direction through the flow path 14. Thus when the port 12 becomes an inlet port, pressure acting on the seated valve head 18a tends to raise the valve off of its seat, but this same pressure also acts on the top face of the bottom diaphragm 52 to completely or partially neutralize the effect of the fluid pressure unseating the valve. If the port 13 becomes an inlet port, pressure on the valve head 18a tends to seat the valve more tightly against the seat 15, but this same pressure also acts on the bottom face of the diaphragm 49 to either completely or partially neutralize the valve-seating effect of the pressure.

The washers controlling the effective areas or equivalent pistons for the diaphragms 49 and 52 can be arranged relative to the effective area of the valve head 18a for completely balancing out the valve-moving effect of fluid pressure on the valve head 18a, or for partially balancing out this effect. As explained above in connection with Figure 3, the diaphragm washers can also be sized relative to the valve head 18a to provide an arrangement which will maintain a controlled load on the valve in the closed position.

The extension member 54 on the lower valve stem 18b depends beneath the bottom of the valve casing 11 and cap 55, and has a hollow ground or arcuate conical pointed bottom end 54a thereon.

A bracket 61 is mounted on the lower end of the casing 11. This bracket carries a solenoid 62 with a coil 63 and a core 64. A spring 65 acts on the core to urge it outwardly in a direction toward the pointed end 54a of the member 54.

The bracket 61 supports a rock shaft 66 on which is keyed a lever 67. This lever 67 is pivoted to an extension 68 of the solenoid core 64. A pin 69 connects the lever and extension. This lever 67 has an arcuate face 67a struck from a radius centered on the shaft 66. The radius of the point 54a is struck from the same center. An abutment 67b is provided on the end of the lever 67 to act on the side wall of the extension member 54 and prevents the lever from swinging completely under the point 54b.

An arm 70 is also secured to the shaft 66. This arm extends forwardly from the shaft and carries, at its outer end, an upright pin or rod 71, the end portions of which are adapted to engage spring contact arms 72 and 73. The arm 72 carries a contact button 72a. The arm 73 carries a contact button 73a. The arm 72 is secured on a base member 74 while the arm 73 is secured on a base member 75. Contact buttons 76 and 77 respectively coact with the buttons 72a and 73a of the contact arms 72 and 73.

As shown at the upper portion of Figure 7, a battery B energizes a double-pole switch S having a first pole P connected through a wire $W_1$ with the solenoid coil 50. The other end of the coil is connected through a wire $W_2$ with the contact button 77.

The second pole P' of the double-pole switch is connected through a wire $W_3$ with the coil 63 of the solenoid 62. The other end of this coil 63 is connected through a wire $W_4$ with the contact button 76. A wire $W_5$ connects both base members 74 and 75 for the contact arms 72 and 73 with the ground.

When the switch S is in the position shown in Figure 7, and the valve 18 is closed, the battery B energizes the coil 50 to draw the solenoid core 51 into the coil against the pressure of the spring 41. This action pulls the valve 18 to its open position as shown. Current flows from the coil 50 through the wire $W_2$ but, since the solenoid 62 is deenergized, the spring 65 acting on the solenoid core 64 moves the lever 67 to a position under the point 54a thereby locking the valve in open position as shown and also rocking the shaft 66 to tilt the arm 70 for moving the rod 71 to separate the contact point 73a from the point 77. Therefore the circuit is opened and the coil 50 is immediately de-energized.

When it is desired to close the valve, the switch S is thrown to engage the pole P' and the battery B energizes the solenoid 62 through the wire W3 for drawing the core 64 into the coil 63 against the pressure of the spring 65. This rocks the lever 67 and rotates the shaft 66. The lever 67 is pulled out from under the pointed end 54a of the member 54 and the spring 41 pushes the valve 18 to its closed position. The rocking of the shaft 66 with the arm 67, however, rocks the arm 70 to move the rod 71 against the contact arm 72 thereby separating the contact point 72a from the point 76 and opening the circuit to immediately de-energize the coil 63.

This solenoid arrangement thus only consumes current during the actual shifting of the valve since, as soon as the valve reaches either its open position or its closed position, the very movement of the valve to such positions de-energizes the solenoid coils. The valve is automatically locked into open position when it is moved to open position. The lock is automatically opened whenever it is desired to close the valve.

From the above descriptions it should be understood that this invention provides valves having a substantially straight-line fluid flow path therethrough, a very low pressure drop, balancing diaphragms to partially or completely neutralize the effect of fluid pressure tending to shift the fluid flow control member or valve, and manually actuated or electrically driven devices which automatically shift the valves and lock the valves in open positions. In the electrically-operated valves of this invention, current is consumed only when the valve is being shifted since, as soon as the valve reaches its shifted position, it automatically breaks the energizing circuit.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A fluid flow control device comprising a casing having interchangeable inlet and outlet ports with a fluid flow path therebetween, a valve seat in said path, a valve slidably mounted in said casing and having a head coacting with said seat to seal the flow path, a diaphragm having a peripheral portion sealingly secured in the casing, a central portion sealingly secured to the valve for co-movement therewith, and an effective flexible portion between the peripheral and central portions with opposite faces respectively exposed to the flow path on opposite sides of said seat, said flexible portion being arranged to bow in opposite directions in response to pressure conditions on opposite sides of said seat, said valve head when seated on said seat having a first effective area acted on by fluid pressure when one port is an inlet port to urge the valve head away from the seat and a second effective area acted on by fluid pressure when the other port is an inlet port to urge the valve head against the seat, means regulating the effective area of the diaphragm in one bowed position to an area greater than the first effective area of the valve head for urging the valve head toward the seat, and means regulating the effective area of the diaphragm in the opposed bowed position to an area less than the second effective area of the valve head for urging the valve head away from its seat whereby fluid pressure on the high pressure side of the valve seat acts upon a first regulated predetermined effective area when one port is the inlet port and acts upon a second regulated predetermined effective area when the other port is the inlet port to create a controlled seating force on the valve head irrespective of which side of the seat is the high pressure side.

2. A fluid flow control device comprising a casing having interchangeable inlet and outlet ports with a fluid flow path therebetween, a valve seat in said flow path, a valve slidable in said casing having a head coacting with said seat, said head having a first face exposed to inlet pressure for unseating the valve when one port is an inlet port and an opposed second face exposed to inlet pressure for seating the valve when the other port is an inlet port, a diaphragm sealingly connecting the valve and casing having a first face exposed to the same pressure as the first face of the valve head for urging the valve toward the seat and a second face exposed to the same pressure as the second face of the valve head for urging the valve away from the seat, means controlling the effective area of the first diaphragm face to an area greater than the effective area of the first valve head face, and means controlling the effective area of the second diaphragm face to an area less than the effective area of the second valve head face whereby a first predetermined effective area for seating the valve is obtained for inlet pressure when one port is the inlet port and a second predetermined effective area for seating the valve is obtained for inlet pressure when the other port is the inlet port.

3. A valve comprising a casing having inlet and outlet ports, a valve seat in said casing between said inlet and outlet ports, a reciprocal valve coacting with said seat, a spring biasing said valve toward said seat, diaphragm means having one face exposed to inlet pressure for assisting the spring in closing the valve and having the other face exposed to outlet pressure for resisting the spring to urge the valve to open position, and said diaphragm means including structure making the effective area of said one face a predetermined amount less than the effective area of said other face so that the effective total bias on the valve for a given inlet pressure is the same at the beginning and end of travel of the valve even though the actual spring load changes, thereby compensating for a change in spring load resulting from such travel.

4. A valve comprising a casing having interchangeable inlet and outlet ports separated by a valve seat, a valve in said casing coacting with said seat, said valve when seated on said seat having a first effective area acted on by fluid pressure when one port is the inlet port to urge the valve away from said seat and a second effective area acted on by fluid pressure when the other port is the inlet port to urge the valve against said seat, a spring biasing said valve to closed position and becoming increasingly loaded as the valve moves toward open position, diaphragm means sealingly affixed to the casing and valve and having opposite faces exposed to said ports on opposite sides of said seat, means regulating the effective area of the diaphragm to an area greater than the first effective area of the valve when inlet pressure acts in a direction to move the valve away from its seat, means regulating the effective area of the diaphragm to an area less than the second effective area of the valve when inlet pressure acts in a direction to move the valve toward its seat, fluid pressure on the high pressure side of the seat thereby acting upon a first regulated predetermined effective area when one port is the inlet port and acting upon a second regulated predetermined effective area when the other port is the inlet port to create a controlled seating force on the valve irrespective of which side of the seat is the high pressure side, and whereby increasing valve closing forces caused by increased loading of the spring as the valve is opened will be offset when the valve is opened by exposure of both sides of the valve and the diaphragm means to substantially the same pressures on opposite sides of the valve seat for cancelling said controlled seating force.

KARL B. BRITTON.

REFERENCES CITED

The following references are of record in the file of this patent:

UNITED STATES PATENTS

| Number | Name | Date |
| --- | --- | --- |
| 629,894 | Dunlap | Aug. 1, 1899 |
| 775,054 | Waterman | Nov. 15, 1904 |
| 1,720,390 | Coles | July 9, 1929 |
| 1,753,529 | Oliphant | Apr. 8, 1930 |
| 1,867,279 | Price | July 12, 1932 |
| 1,877,859 | Hansen | Sept. 20, 1932 |
| 1,891,133 | Bahnson | Dec. 13, 1932 |
| 2,302,252 | Raymond | Nov. 17, 1942 |
| 2,312,063 | Allen | Feb. 23, 1943 |
| 2,365,650 | Shaw | Dec. 19, 1944 |
| 2,376,322 | Benaway | May 22, 1945 |